July 21, 1925.  1,546,406
J. A. REED
COOLER
Filed Feb. 21, 1925  2 Sheets-Sheet 1

J. A. Reed, INVENTOR.

BY Geo. P. Kimmel, ATTORNEY.

July 21, 1925. 1,546,406
J. A. REED
COOLER
Filed Feb. 21, 1925 2 Sheets-Sheet 2

J. A. Reed, INVENTOR.
BY
Geo. P. Kimmel, ATTORNEY.

Patented July 21, 1925.

1,546,406

UNITED STATES PATENT OFFICE.

JOSEPH A. REED, OF CLYDE, TEXAS.

COOLER.

Application filed February 21, 1925. Serial No. 10,978.

*To all whom it may concern:*

Be it known that I, JOSEPH A. REED, a citizen of the United States, residing at Clyde, in the county of Callahan and State of Texas, have invented certain new and useful Improvements in Coolers, of which the following is a specification.

This invention relates to coolers, of that type employed for the cooling of milk, but it is to be understood that the cooler, in accordance with this invention, can be employed for cooling any article or substance for which it is found applicable, and the invention has for its object to provide, in a manner as hereinafter set forth, a cooler having means for efficiently cooling an article or substance stored therein, and further with the cooler including, a supporting body, in a manner as hereinafter set forth, carrying a removable water supply means and a removable water conducting member, and with said body formed of a series of interengaging detachably connected sections whereby said body can be conveniently set up and knocked down when occasion requires.

A further object of the invention is to provide, in a manner as hereinafter set forth, a cooler including a water container and a water collector, and a plurality of supporting standards for maintaining said container and collector in superposed relation, and with said standards, container and collector having interengaging means for detachably connecting them together to maintain the container and collector in active position.

A further object of the invention is to provide, in a manner as hereinafter set forth, a cooler of that type having means to provide for the evaporation of water for reducing the temperature of the article or substance supported within the cooler, and further to provide a simple, inexpensive and efficient cooler adapted to be readily taken apart and compactly arranged for convenient shipping.

Further objects of the invention are to provide in a manner as hereinafter set forth, a cooler of the type referred to, which is simple in its construction and arrangement, readily knocked down and assembled, strong, durable, thoroughly efficient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1:
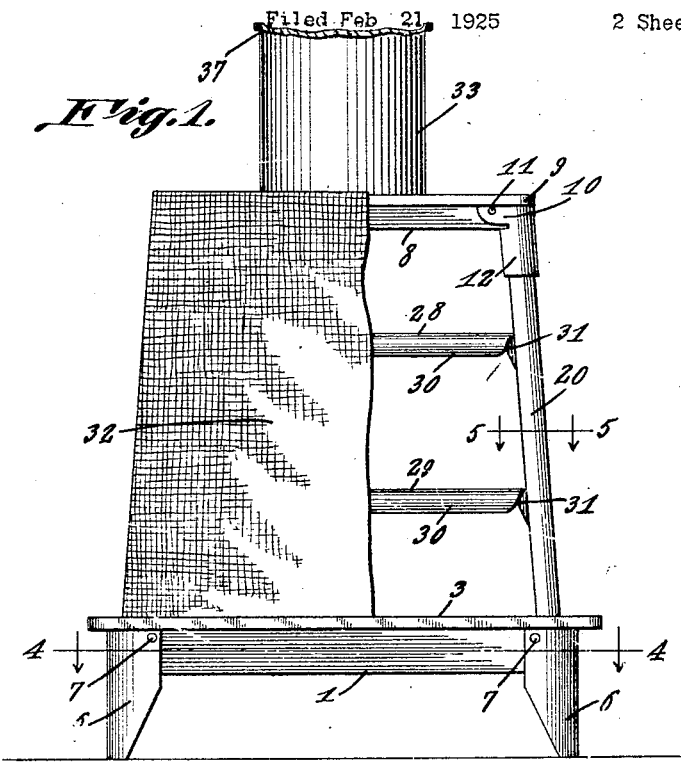
Figure 1 is an elevation, broken away, of a cooler in accordance with this invention.
Figure 2:
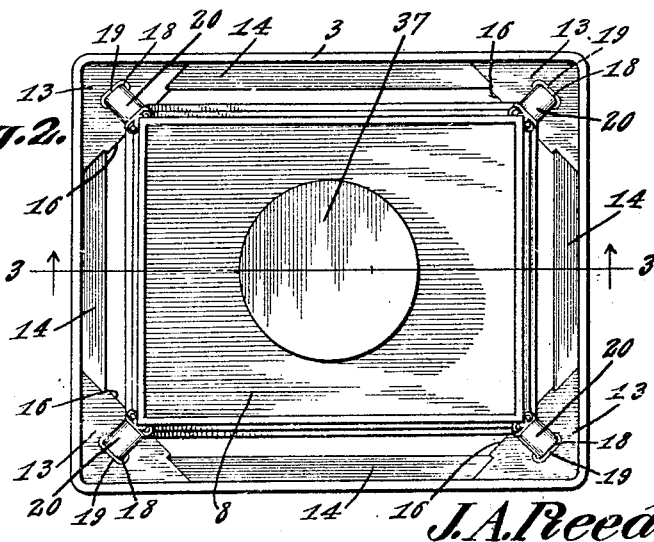
Figure 2 is a top plan view, of the cooler, with the water conducting member removed.

A cooler, in accordance with this invention, comprises a water collector, means for supporting the same above the ground or other object, a plurality of supporting standards, a water container, a water supply tank, a plurality of shelves or supports, a water conducting member, and an upper and lower set of coupling members for detachably connecting the standards, respectively, to the container and water collector. The water collector is in the form of a pan consisting of a rectangular body portion 1, provided at its top, throughout, with an outwardly extended lateral continuous flat flange 2 provided with a vertically extending bead 3 throughout the outer side thereof. The bottom of the body portion 1 has an opening 4 provided with an outlet, and which is normally closed by a removable plug 5.

The means for supporting the water collector consists of four vertically disposed legs 6, and each of which preferably is in the form of an angle iron of substantial height. Each of the legs 6 is positioned against one corner of the body portion 1 and abuts against the lower face of the flange 2. The legs 6 are secured to the body portion 1 of the water collector by the hold-fast devices 7.

The water container is in the form of a pan and consists of a rectangular body portion 8 provided at its top with an outwardly projecting lateral continuous flange 9. The water container is of less length and less width than the length and width of the water collector, and the flange 9 of the water container is of less width than the flange 2 of the water collector.

The upper set of coupling members is secured to and depends from the water container, and four upper coupling members are employed, and each is arranged at one corner of the body portion 8 of the collector. Each of the upper coupling members consists of an angle-shaped upper portion 10 which is positioned against the outer face of the body portion 8 at a corner thereof and abuts against the bottom of the flange 9. The upper portion 10 of the coupling member is secured to the body portion 8 by hold-fast devices 11, only one of which is shown. Each upper coupling member further includes an outwardly inclined sleeve 12 which depends from the upper portion 10, abuts against the bottom 8 of the water container, and is oval-shaped in cross section.

The lower set of coupling members is arranged within the water collector and the number of the lower coupling members correspond to the number of the upper coupling members, and each of the lower coupling members consists of a triangular-shaped plate 13, which is mounted on the ledge 14 formed in the flange 2 and abuts against the inner face of bead 3 at one corner of the water collector. The inner edge of the plate 13, intermediate its ends, is provided with a depending flange 16 which abuts against the inner face at the top of one of the side walls and one of the end walls of the body portion 1. The flange 16 wedges against the said walls whereby the plate 13 is maintained in abutting position against the inner face of the bead 3. Formed integral with and depending from the plate 3 is an outwardly inclined sleeve 17 of oval contour in cross section. The plate 16 has an opening 18 which registers with the sleeve 17, and surrounding said opening 18 is a bead 19.

The sleeves 12 of the upper coupling members and the sleeves 17 of the lower coupling members provide sockets for the reception of the ends of the supporting standards for the purpose of detachably connecting these latter in position.

Figure 4:
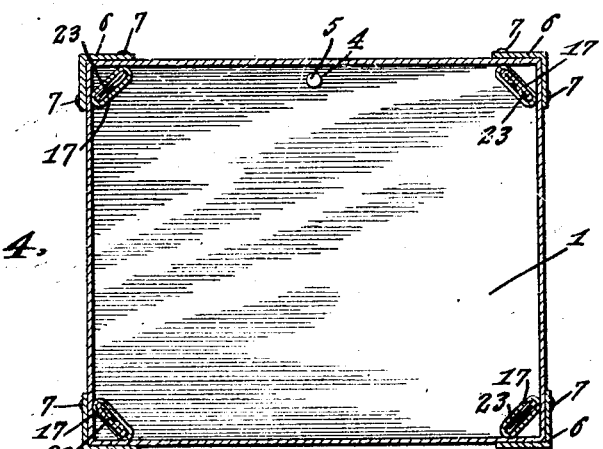
Figure 4 is a section on line 4—4 of Figure 1.

Four supporting standards are employed, which are disposed at an inclination, and the said standards provide means for detachably connecting the water container to the water collector and for maintaining the water container in spaced relation with respect to the water collector. Each of the supporting standards is formed from a substantially wide strip 20 of metallic material, said strip is of a length desired and is bent upon itself in a circular manner to provide a pair of spaced lengthwise extending cylindrical split combined coupling and reinforcing members 21 and 22, which are oppositely disposed with respect to each other and further arranged in spaced relation. The upper terminal portion of each of the standards is compressed to conform to the contour of the socket formed by the sleeve 12, and the lower terminal portion of each of the standards is compressed to conform to the contour of the socket formed by the sleeve 17. The compressed upper and lower portions of each standard is of the form as illustrated at 23 in Figure 4.

Figure 3:
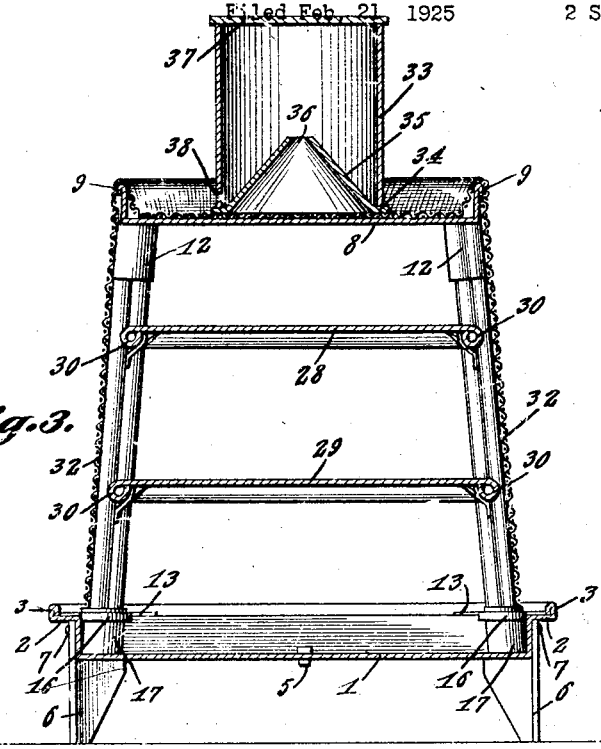
Figure 3 is a section on the line 3—3 of Figure 2 with the water conducting member in position.
Figure 5:
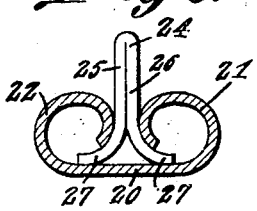
Figure 5 is a section on line 5—5 of Figure 1.

Each of said standards is provided with a plurality of superposed supports, which are arranged in spaced relation, and each of which is formed from a strip 24 of metallic material, see Figure 5, bent upon itself to provide a pair of abutting folds 25, 26, each formed with a flaring free end 27. The flared ends of the folds 25 and 26 are oppositely disposed with respect to each other and are resilient. The support is positioned between the clamping members 21, 22, and with the flared ends of the folds extending into said members in opposite directions. The split ends 21 of the clamping members coact with the flaring ends 27 of the folds of the support to set up a frictional lock to detachably secure the support to the standard. The supports project inwardly from the inner side of the standards and the upper supports are arranged in alignment with respect to each other, and a like arrangement is had with respect to the lower supports, see Figure 3. The supports can be adjusted lengthwise of the standards whereby the distance between the upper and lower supports can be lengthened or shortened when desired.

Removably mounted upon the upper supports is a shelf 28, and upon the lower supports a shelf 29. The upper shelf 28 is of greater size than the lower shelf 29, and each of said shelves has the marginal portion thereof inturned, as at 30, to provide a depending cylindrical reinforcing bead. The bead of each of the shelves is provided with a series of slits 31, and said slits correspond in number to the number of upper and lower supports and provide means for the mounting of the shelves in position, and further provide means to prevent the shifting of the shelves when mounted upon the supports, in view of the fact that the bead of each shelf is positioned at each side of a support, or in other words, by providing the bead with the plurality of slits, the supports extend through the slits and permit of the body of the shelf seating on the top edge of the supports.

The water conducting member, which is indicated at 32, is in the form of an apron, and when mounted in operative position incloses the water container and extends therefrom to the ledge 14 and further incloses the standards. The apron is formed of a thin fabric possessing an absorbent characteristic, and said fabric extends into the water container, absorbs the water therefrom, or in other words, the water is drawn by capillary action into the fabric apron or cover 32 and down which it flows into the water collector. During the passage of the water down the inclosing apron or cover, a greater or less quantity of the water is evaporated, thereby lowering the temperature of the air within the cooler and the articles or substances supported by the shelves 28 and 29.

Positioned within the water container and upon the apron or cover 32 is a water tank consisting of a cylindrical body portion 33, seating on the flange 34 of a cone-shaped bottom 35, formed with an opening 36 at the top thereof. The body portion 33 is provided with a removable cover 36, and near its lower end with a water outlet 38 for discharging water into the water container. The outlet 38 provides for the regulation of the supply of water from the tank to the water container, as when said outlet 38 is submerged by water into the water container, the supply of water to the latter is cut off, and when said opening or outlet 38 is positioned above the level of the water in the container, the supply from the tank to the container is continued.

The cover 37 may be fixedly secured to the body portion 33 and provided with a closable filling opening. The opening 36, in the bottom 35, can if desired be employed as a filling opening when the water tank is inverted. If so, the closure 37 is fixedly secured to the body portion 33. The opening 36 provides means, when the water tank is in operative position, for the supply of air to the interior of the tank. The cone-shaped bottom 35 facilitates the discharge of the water from the tank through the outlet 38 when the latter is not submerged.

From the foregoing description, taken in connection with the accompanying drawings, it is obvious that a cooler is set up which may be readily assembled and disassembled when occasion requires, and furthermore a cooler is set up including a water collector, into which the water dripping from the apron or cover 32 is collected, and the water collected can be discharged from the collector when occasion requires. Then, furthermore, the cooler includes means whereby the shelves can be adjusted relatively to each other when required for supporting different sizes of articles or substances, and that it does not require the connecting of the supporting standards in an upright position through the medium of hold-fast devices, and although the preferred embodiment of the invention is as illustrated and described, yet it is to be understood that changes in the details of the construction can be had, which will fall within the scope of the claim hereunto appended.

What I claim as new and desire to secure by Letters Patent is:

A cooler comprising a water collector provided at its top with a laterally extending continuous flange forming a ledge, a lower set of coupling members mounted on said ledge and depending therefrom into said collector, a water container, an upper set of coupling members secured to and depending from said water container, a plurality of standards having their ends detachably engaging in said upper and lower coupling members, a water conducting member in the form of an apron inclosing said container, said members extending to said ledge, a water tank mounted in said container and formed with a cone-shaped bottom having an opening in the apex thereof and further formed in proximity to said bottom with an outlet for supplying water to said container, a plurality of superposed shelves, and means carried by the standards for detachably connecting the shelves therewith.

In testimony whereof, I affix my signature hereto.

JOSEPH A. REED.